United States Patent
Obayashi et al.

(10) Patent No.: US 9,083,193 B2
(45) Date of Patent: Jul. 14, 2015

(54) VEHICULAR ELECTRIC POWER SUPPLY DEVICE AND ELECTRIC POWER SUPPLY SYSTEM

(75) Inventors: Kazuyoshi Obayashi, Chita-gun (JP); Mitsuru Fujita, Kuwana (JP); Hiroshige Asada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 714 days.

(21) Appl. No.: 13/359,025

(22) Filed: Jan. 26, 2012

(65) Prior Publication Data

US 2012/0228928 A1    Sep. 13, 2012

(30) Foreign Application Priority Data

Mar. 11, 2011    (JP) .................................. 2011-54457

(51) Int. Cl.
| | |
|---|---|
| H05K 1/00 | (2006.01) |
| H05K 1/11 | (2006.01) |
| H05K 1/18 | (2006.01) |
| H02J 7/00 | (2006.01) |

(Continued)

(52) U.S. Cl.
CPC ............. *H02J 7/0054* (2013.01); *B60L 3/0046* (2013.01); *B60L 3/0092* (2013.01); *B60L 11/182* (2013.01); *B60L 11/1816* (2013.01); *B60L 11/1842* (2013.01); *H02J 1/10* (2013.01); *Y02E 60/721* (2013.01); *Y02T 10/7005* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y04S 10/126* (2013.01)

(58) Field of Classification Search
CPC ......... H02J 7/0054; H02J 1/00; B60L 3/0046; B60L 11/1842; B60L 11/1816; B60L 11/182; B60L 3/0092

USPC .......................................................... 307/9.1
See application file for complete search history.

(56) References Cited

U.S. PATENT DOCUMENTS 5,462,439 A * 10/1995 Keith ............................ 320/109
5,858,568 A *  1/1999 Hsu et al. ...................... 429/425

(Continued)

FOREIGN PATENT DOCUMENTS

| JP | A-11-178234 | 7/1999 |
|---|---|---|
| JP | 2007236023 A * | 9/2007 |

(Continued)

OTHER PUBLICATIONS

Japanese Office Action issued in Application No. 2011-054457; Dated Jan. 29, 2013 (With Translation).

*Primary Examiner* — Rexford Barnie
*Assistant Examiner* — Elim Ortiz
(74) *Attorney, Agent, or Firm* — Oliff PLC

(57) ABSTRACT

The electric power supply system includes a stationary device and a mobile device. The mobile device includes a rotary electric machine driven by an engine, a vehicular battery which is used to move the vehicle, and an emergency battery. The stationary battery in the stationary device may be charged by either one of the rotary electric machine, the stationary battery or the emergency battery via an inter-battery power line. The amount of charge to the stationary battery is set based on an amount of necessary power WRQ which the stationary device needs, and an amount of available power WVH which the mobile device can supply. The stationary battery can be charged in an efficient manner and with a sufficient amount of electric power.

10 Claims, 6 Drawing Sheets

(51) Int. Cl.
  *B60L 3/00*   (2006.01)
  *B60L 11/18*  (2006.01)
  *H02J 1/10*   (2006.01)

(56) References Cited

U.S. PATENT DOCUMENTS

| | | | |
|---|---|---|---|
| 6,104,160 A | 8/2000 | Iwata et al. | |
| 7,747,739 B2 * | 6/2010 | Bridges et al. | 709/224 |
| 2008/0084286 A1 * | 4/2008 | Teramura et al. | 340/438 |
| 2008/0169651 A1 * | 7/2008 | Oyobe et al. | 290/7 |
| 2010/0019728 A1 * | 1/2010 | Ichikawa et al. | 320/134 |
| 2010/0164287 A1 * | 7/2010 | Komazawa et al. | 307/44 |

FOREIGN PATENT DOCUMENTS

| | | | |
|---|---|---|---|
| JP | A-2007-236023 | | 9/2007 |
| JP | 2009278776 A | * | 11/2009 |
| JP | A-2009-278776 | | 11/2009 |
| JP | 2010091430 A | * | 4/2010 |
| JP | A-2010-074997 | | 4/2010 |
| JP | A-2010-091430 | | 4/2010 |
| JP | 2010154637 A | * | 7/2010 |
| JP | A-2010-154637 | | 7/2010 |
| JP | 2011024322 A | * | 2/2011 |
| JP | A-2011-024322 | | 2/2011 |
| JP | 2011178234 A | * | 9/2011 |

* cited by examiner

FIG. 1
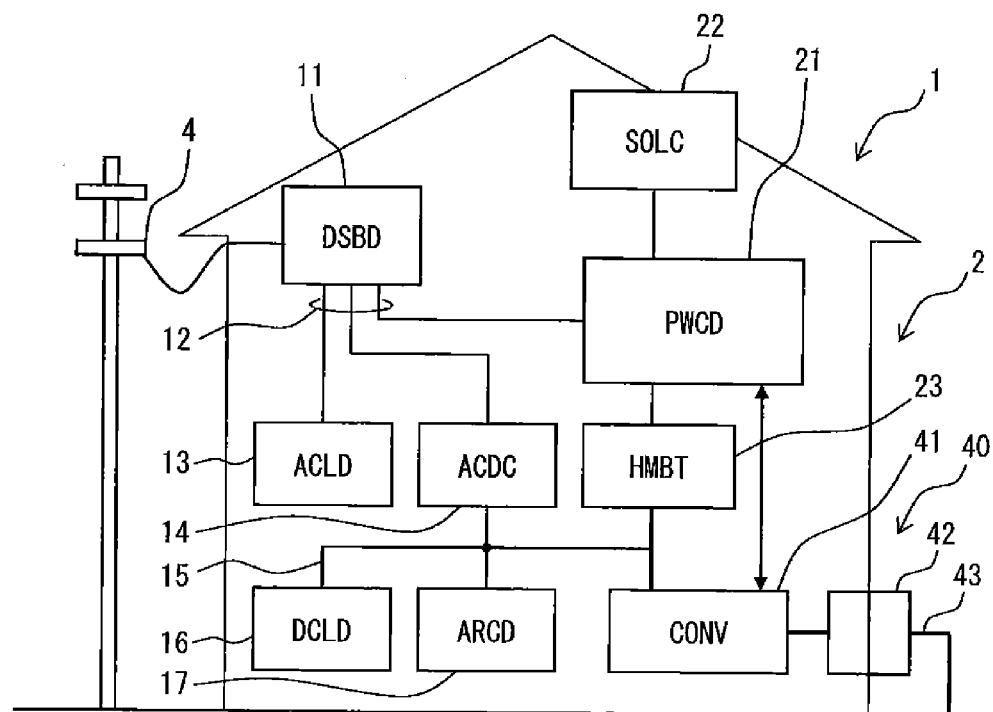
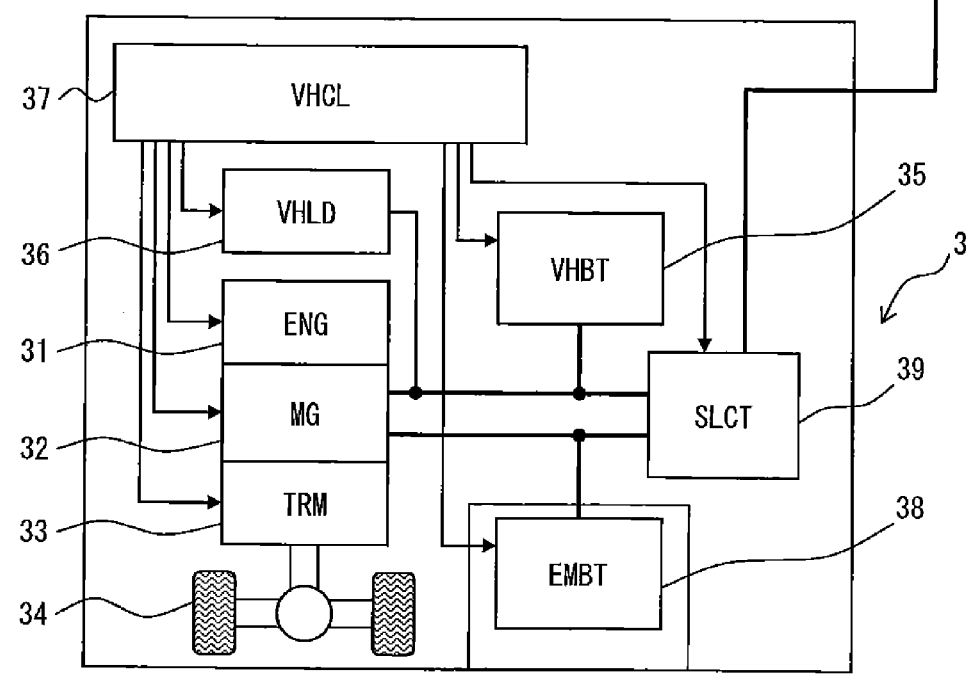

VEHICULAR ELECTRIC POWER SUPPLY DEVICE AND ELECTRIC POWER SUPPLY SYSTEM

CROSS REFERENCE TO RELATED APPLICATION

This application is based on Japanese Patent Application No. 2011-54457 filed on Mar. 11, 2011, the disclosure of which is incorporated herein by reference in its entirety.

TECHNICAL FIELD

The present disclosure relates to a vehicular electric power supply device including a battery mounted on a vehicle and an electric power supply system including the vehicular electric power supply device.

BACKGROUND

JPH11-178234A discloses a system that supplies electric power from a vehicular battery mounted on a vehicle to a stationary electric power supply device mounted on a place, such as a residence. The system can perform a reverse flow of electric power from a vehicular battery to an electric power system in a residence by using a connecting device for charging the vehicular battery.

JP2010-154637A also discloses a system that supplies electric power from a vehicular battery or a generator driven by an engine to a stationary electric power supply device.

JP2010-74997A discloses a system that includes a DC power supply route from a stationary battery to a low power device such as a lighting device, and, in addition, a secondary DC power supply route between the stationary battery and a vehicular battery.

SUMMARY

In the conventional technology disclosed in JPH11-178234A, electric power is supplied from a vehicular battery to an AC line which is a main power distribution system for a stationary electric power supply device. There is a regulation to restrict a capacity of an AC line in a residence. For example, some regulation defines a maximum current capacity, such as 15 A or 20 A. For this reason, there was a problem that the conventional system could not reverse large electric power from a vehicular battery. Especially, in JPH11-178234A, in a case that a stationary battery installed in a residence is charged, it may take a long time for charging due to the regulation for restricting current through an AC line. In addition, since charging current flows both a DC/AC converter and an AC/DC converter from a vehicular battery, there was a problem that it is not efficient. Furthermore, since electric power is supplied from a single vehicular power source to a residence, there is a problem that electric power which can be supplied is also limited.

The system disclosed in JP2010-154637A also supplies electric power to an AC line of the stationary electric power supply device in a residence. Therefore, the system has the same problem described above.

In JP2010-74997A, the system uses a vehicular battery as the only one power source mounted on a vehicle. For this reason, there is a problem that electric power which can be supplied is limited. For example, a stationary battery may not be sufficiently charged when a vehicle and a residence are electrically connected. In other words, it may take a long period of time to charge a stationary battery.

It is an object of the present disclosure, to provide a vehicular electric power supply device and an electric power supply system that can charge a stationary battery fixed in a place such as a residence etc. from a power source mounted on a vehicle in an efficient manner and with a sufficient amount of electric power.

The present disclosure employs the following technical means, in order to attain the above-mentioned object. In one embodiment of the present disclosure, an electric power supply system is provided. The electric power supply system comprises a stationary device including a stationary battery, and a mobile device including a plurality of vehicular power sources including a generator driven by an engine and a vehicular battery. The electric power supply system further comprises an inter-battery power connection arranged between the stationary battery and the vehicular battery. The stationary device includes a stationary setting module to set up an amount of necessary power which the stationary battery needs. The mobile device includes a vehicular setting module to set up an amount of available power which can be supplied by the plurality of vehicular power sources. The mobile device further includes a selecting module which selects one or more vehicular power source based on the amount of necessary power and the amount of available power, and activates the selected vehicular power source to supply electric power to the stationary battery via the inter-battery power connection.

According to the above arrangement, electric power can be supplied from the electric power sources on the mobile device to the stationary battery in the stationary device via the inter-battery power connection. It is possible to perform power transmission in an efficient manner. In addition, in the mobile device, one or more vehicular power source is selected based on the amount of necessary power, and the amount of available power. For example, one or more vehicular power source is selected so that the amount of necessary power can be supplied. Thereby, the stationary battery in the stationary device can be charged with a sufficient amount of electric power. In addition, electric power can be supplied from the mobile device to the stationary device, without overloading the vehicular battery and the generator in the mobile device.

In one embodiment of the present disclosure, a vehicular electric power supply device is provided. The vehicular electric power supply device comprises a plurality of vehicular power sources including a generator driven by an engine and a vehicular battery. The vehicular electric power supply device comprises a vehicular setting module to set up an amount of available power which can be supplied by the plurality of vehicular power sources. The vehicular electric power supply device further comprises a selecting module which selects one or more vehicular power source based on an amount of necessary power which a stationary battery in a stationary device needs and the amount of available power, and activates the selected vehicular power source to supply electric power to the stationary battery via an inter-battery power connection arranged between the stationary battery and the vehicular battery.

BRIEF DESCRIPTION OF THE DRAWINGS

The above and other objects, features and advantages of the present disclosure will become more apparent from the following detailed description made with reference to the accompanying drawings. In the drawings:

FIG. 1 is a block diagram showing a configuration of an electric power supply system according to a first embodiment of the present disclosure;

DETAILED DESCRIPTION

Figure 2:
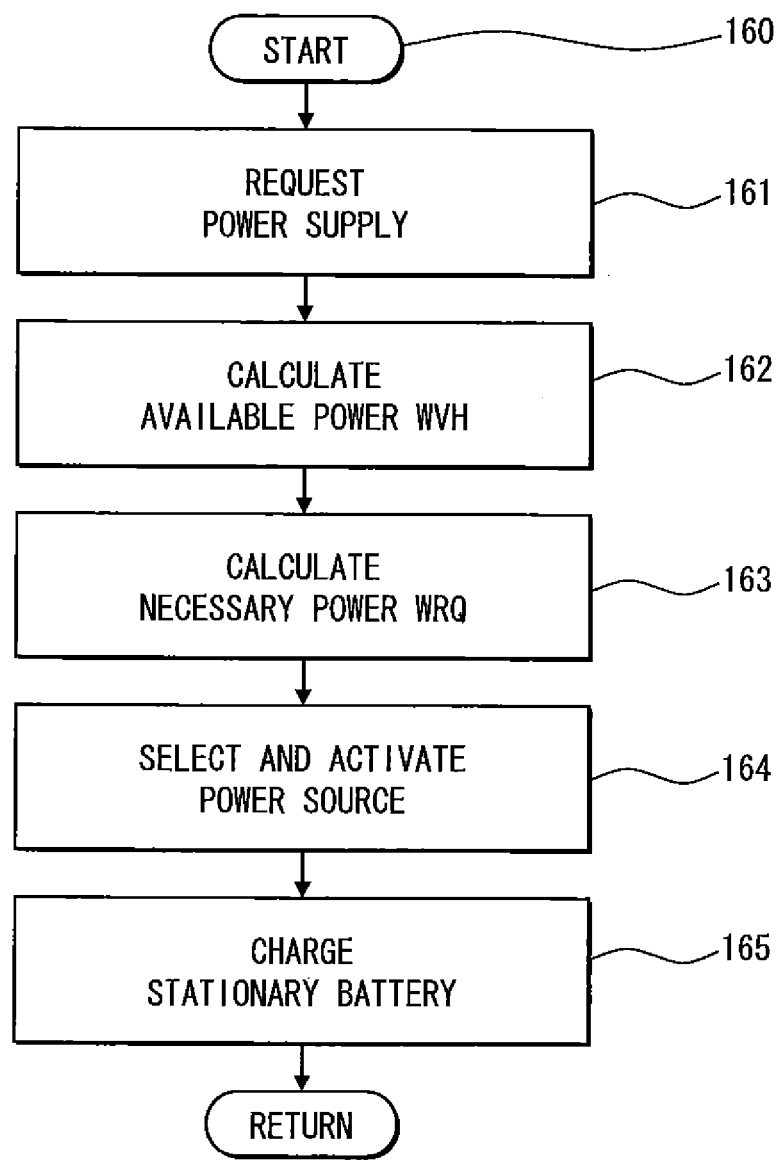
FIG. 2 is a flow chart showing an operation of the electric power supply system according to the first embodiment.

A plurality of embodiments of the present disclosure are explained referring to drawings. Components and parts corresponding to the components and parts described in the preceding description may be indicated by the same reference number and may not be described redundantly. In a case that only a part of component or part is described, other descriptions for the remaining part of component or part in the other description may be incorporated. The embodiments can be partially combined or partially exchanged in some forms which are clearly specified in the following description. In addition, it should be understood that, unless trouble arises, the embodiments can be partially combined or partially exchanged each other in some forms which are not clearly specified.

First Embodiment

FIG. 1 is a block diagram showing a configuration of an electric power supply system 1 according to a first embodiment of the present disclosure. In this specification, AC stands for an alternating current, and DC stands for a direct current. The electric power supply system 1 is provided with a stationary device 2 and a mobile device 3. The stationary device 2 is installed in a residence or a place of business. The stationary device 2 provides a stationary electric power supply device which supplies electric power in a residence or a place of business. The mobile device 3 is mounted on a vehicle which can move. The mobile device 3 provides a vehicular electric power supply device which supplies electric power in a vehicle.

The stationary device 2 is an electric power supply device for which electric power is supplied from a power grid 4 and which supplies electric power to a plurality of loads installed in the residence or the place of business. The power grid 4 is a large area power grid that is usually provided by an electric power industry company or a power distribution company. The stationary device 2 is provided with a distribution board (DSBD) 11 provided as a power receiving facility for receiving power from the power grid 4. An AC line 12 is extended from the distribution board 11, and is laid in the residence or the place of business. The stationary device 2 is provided with a plurality of AC devices. The plurality of AC devices may include an AC load (ACLD) 13 and an AC/DC converter (ACDC) 14. The AC line 12 is connected to the AC load 13 and the AC/DC converter 14. The AC load 13 is an electric apparatus, such as a fan in the residence. The AC/DC converter 14 transforms AC power supplied from the AC line 12 into DC power and supplies DC power to the DC line 15. The DC line 15 is laid in the residence or the place of business. The stationary device 2 is provided with a plurality of DC devices. The plurality of DC devices may include a DC load (DCLD) 16 and an air-conditioner (ARCD) 17. The DC line 15 is connected to the DC load 16 and the air-conditioner 17. The DC load 16 is an electric apparatus, such as a lighting device in the residence.

The stationary device 2 is provided with a power conditioner (PWCD) 21, a solar battery (SOLC) 22, and a stationary battery (HMBT) 23. The solar battery 22 is the small-scale power generation facility installed in the residence or the place of business. Small-scale power generation facility may be provided, instead of or in addition to a fuel cell, a wind generator, etc. The stationary battery 23 can conserve a part of electric power generated by the solar battery 22. The stationary battery 23 is connected also to the DC line 15. In order to supply DC power to the DC line 15 when the power grid 4 gets a power failure, the stationary battery 23 can conserve an electric power for power failure. The stationary battery 23 can be charged from the power conditioner 21 or the DC line 15. The stationary battery 23 can be discharged to the power conditioner 21 or the DC line 15.

One of the AC line 12 extended from the distribution board 11 is connected to the power conditioner 21. The solar battery 22 and the stationary battery 23 are connected to the power conditioner 21. The power conditioner 21 controls the output voltage and output current of the solar battery 22 so that the solar battery 22 demonstrates high efficiency. The power conditioner 21 controls the charge to the stationary battery 23, and the discharge to the AC line 12 from the stationary battery 23. Furthermore, the power conditioner 21 is also a system interconnection inverter. The power conditioner 21 can perform a reverse power flow in which electric power generated by the solar battery 22 or electric power discharged from the stationary battery 23 is reversed to the power grid 4.

The mobile device 3 is provided with an engine (ENG) 31 mounted on the vehicle as a power source for moving the vehicle, and a rotary electric machine (MG) 32 mounted on the vehicle as another power source for moving the vehicle. The vehicle is the one that may be so called a hybrid vehicle that can move with the engine 31 and/or the rotary electric machine 32. The engine 31 is an internal combustion engine. The rotary electric machine 32 is a motor generator which can function as both a generator and an electric motor in a selective manner. The engine 31 and the rotary electric machine 32 are operatively connected with the drive unit containing a transmission 33 for the vehicle. The drive unit drives driving wheels 34 of the vehicle.

The mobile device 3 is provided with a vehicular battery (VHBT) 35. The in-vehicle battery 35 is a battery for the run for the hybrid vehicles which supply electric power to the rotation electrical machinery 32. The vehicular battery 35 is a standard battery which has to be mounted on the vehicle. The vehicular battery 35 supplies a high voltage, such as hundreds of volts for the rotary electric machine 32. The vehicular battery 35 is charged by electric power generated by the rotary electric machine 32. Furthermore, the vehicular battery 35 is also charged via an inter-battery power line 40 mentioned later by electric power supplied from the stationary device 2.

The mobile device 3 is provided with a vehicular load (VHLD) 36. The vehicular battery 35 supplies electric power to the vehicular load 36. The mobile device 3 is provided with a control device (VHCL) 37. The control device 37 is a control device for a hybrid car which controls the engine 31, the rotary electric machine 32, the transmission 33, and the vehicular battery 35. The control device 37 provides an internal charge control device which charges the vehicular battery 35 with electric power generated by the rotary electric machine 32. Furthermore, the control device 37 also provides an external charge control device which controls charging to the vehicular battery 35 from the stationary battery 23, and supplying to the stationary battery 23 from the vehicular battery 35.

The mobile device 3 is provided with an emergency battery (EMBT) 38. The emergency battery 38 is a battery for rescuing the vehicle, and is separately disposed from the vehicular battery 35. The emergency battery 38 may also be referred to as an optional battery. The emergency battery 38 may be an optional device which may be mounted on or not mounted on the vehicle in a selectable manner. If the emergency battery 38 is mounted on the vehicle, the emergency battery 38 is connected to a supply route to the rotary electric machine 32. The emergency battery 38 enables the vehicle to move at least a short distance. The emergency battery 38 is mounted on the vehicle in order to supplement a capacity of the vehicular battery 35, or in order to enable the vehicle to move when the electric power charged in the vehicular battery 35 becomes insufficient. The emergency battery 38 is charged with electric power generated by the rotary electric machine 32. Furthermore, the emergency battery 38 is also charged via the inter-battery power line 40 mentioned later with electric power supplied from the stationary device 2. The emergency battery 38 is under control of the control device 37.

The mobile device 3 is provided with a selector circuit (SLCT) 39. The selector circuit 39 is selectively connects either the vehicular battery 35 or the emergency battery 38 to the inter-battery power line 40. The selector circuit 39 may be provided with a plurality of relays. The selector circuit 39 provides, in response to instructions of the control device 37, either a state in which the vehicular battery 35 and the inter-battery power line 40 are connected, or a state in which the emergency battery 38 and the inter-battery power line 40 are connected.

As stated above, it can be said that the mobile device 3 is provided with a plurality of vehicular power sources. The plurality of vehicular power sources includes the rotary electric machine 32 provided as a generator driven by the engine 31, the vehicular battery 35, and the emergency battery 38.

The inter-battery power line 40 is provided between the stationary device 2 and the mobile device 3. The inter-battery power line 40 can be switched between a connected state and a disconnected state. The inter-battery power line 40 provides an inter-battery power connection between the stationary battery 23 and the vehicular battery 35. The inter-battery power line 40 is also an apparatus which provides a power line between the stationary battery 23 and a plurality of vehicular power sources 32, 35, and 38. The inter-battery power line 40 is a bidirectional power supply device which can perform not only power supply in a forward direction from the stationary battery 23 to the vehicular battery 35, but also power supply in a reverse direction from the plurality of vehicular power sources including the vehicular battery 35 to the stationary battery 23. The inter-battery power line 40 is provided with a voltage converter (CONV) 41 provided in the stationary device 2, a coupler 42 which can be connected or disconnected, and a cable 43 which connects the coupler 42 and the selector circuit 39. The voltage converter 41 is a bidirectional voltage converter which permits power supply from the stationary battery 23 to the vehicular battery 35, and power supply from the vehicular power source to the stationary battery 23.

The inter-battery power line 40 has power capacity that is larger than that of the AC line 12 and the DC line 15 which are charge-and-discharge lines for the stationary battery 23 in the stationary device 2. For example, interior wiring for home application has standard power capacity, such as 100V-15 A, or 200V-20 A. The inter-battery power line 40 has larger power capacity, for example, 300V-20 A, than the interior wiring for home application. Thereby, bidirectional electric power supply between the vehicular power source and the stationary battery can be performed with large electric power capacity, without being restricted to the power capacity of the charge-and-discharge line in the stationary device.

The coupler 42 of the inter-battery power line 40 is connected when charging the vehicular battery 35 from the stationary device 2. The coupler 42 of the inter-battery power line 40 is connected also when charging the stationary battery 23 from the vehicular power sources belonging to the mobile device 3. When the inter-battery power line 40 is established, DC electric power can be supplied via the inter-battery power line 40 which is exclusively prepared between the stationary battery 23 and the vehicular battery 35, without using the AC line 12 and the DC line 15 in the stationary device 2. For this reason, large electric power can be supplied. It is also possible to supply electric power with high efficiency.

When supplying electric power from the stationary device 2 to the vehicular battery 35, related devices in the stationary device 2 and the mobile device 3 are controlled by the power conditioner 21 and the control device 37. When supplying electric power from the vehicular battery 35 to the stationary device 2, related devices in the stationary device 2 and the mobile device 3 are controlled by the power conditioner 21 and the control device 37. The power conditioner 21 is a control device for the stationary device 2. The control device 37 is a control device for the mobile device 3. The power conditioner 21 and the control device 37 form and provide a control device for the electric power supply system 1.

Between the control device of the stationary device 2, and the control device of the mobile device 3, a communication device is provided in order to permit data communication between them. For example, the power conditioner 21 and the control device 37 are provided with a power-line-communication device which uses the inter-battery power line 40 for data communication. The power conditioner 21 and the control device 37 may be provided with radio communication devices for data communication.

A control device is provided with a microcomputer having a storage medium readable by a computer. The storage medium stores a program readable by the computer. The storage medium can be provided by a memory device. The program, when executed by the control device, makes the control device to function as devices described in this specification, and makes the controls device to perform a control method described in this specification. The means provided by the control device may be referred to as a functional block or a module which performs a predetermined function.

FIG. 2 is a flow chart showing an operation of the electric power supply system 1 according to the first embodiment. In the drawing, a set of power supply processing 160, which supplies electric power from the vehicular power source to the stationary battery and is performed by the power conditioner 21 and the control device 37, is illustrated. In this power supply processing 160, the stationary battery 23 is charged from the vehicular power source. the power supply processing 160 is performed when the inter-battery power line 40 is built by connecting the coupler 42 during a predetermined power supply condition is satisfied. For example, the above-mentioned predetermined power supply condition may be a power failure of the power grid 4. In such a case, the mobile device 3 is used as rescue vehicle which supplies electric power to the stationary device 2. The mobile device 3 may visit two or more stationary devices 2. Thereby, electric power can be supplied to two or more stationary devices 2. The mobile device 3 may charge the vehicular battery 35 during a period to move from one stationary device 2 to another stationary device 2. The mobile device 3 charges the stationary battery 23 quickly by using the inter-battery power line 40 prepared exclusively between the batteries.

In step 161, the stationary device 2 requests power supply to the mobile device 3. In step 162, the mobile device 3 calculates an amount of available power WVH and sends it to the stationary device 2. The mobile device 3 checks states of the vehicular power sources belonging to the mobile device 3. Then, the mobile device 3 calculates the amount of available power WVH which can be supplied by the vehicular power sources. Then, the mobile device 3 transmits the amount of available power WVH to the stationary device 2. Processing of step 162 provides a vehicular setting module which sets up the amount of available power WVH which can be supplied by the plurality of vehicular power sources.

In step 163, the stationary device 2 calculates an amount of necessary power WRQ and sends it to the mobile device 3. The amount of necessary power WRQ may be referred to as a command value. The stationary device 2 sets up the amount of necessary power WRQ based on the amount of consuming electricity presently consumed in the stationary device 2, and the amount of available power WVH obtained from the mobile device 3. For example, the stationary device 2 sets the amount of necessary power so that at least a part of amount of consuming electricity may be supplied. Moreover, the amount of necessary power WRQ may be set to not exceed the amount of available power WVH. The stationary device 2 may set the amount of necessary power WRQ by considering an amount of electric power privately generated by the small-scale power generating facility, such as the solar battery 22. In this case, the stationary device 2 sets at least a part of remaining electric power that subtracted the privately generated power from the amount of consuming electricity as the amount of necessary power WRQ. Furthermore, if there are two or more mobile devices 3 belonging to the residence or the place of business in which the stationary device 2 is installed, the amount of necessary power WRQ to be requested to one of the mobile devices 3 may be set by considering electric power available from those mobile devices 3. The stationary device 2 may set the amount of necessary power WRQ for the mobile device 3 by considering a period of time in which the mobile device 3 can be exclusively used for the stationary device 2. For example, the stationary device 2 may set the amount of necessary power WRQ to an amount of electric power that can be received during a period in which the stationary device 2 can monopolize the mobile device 3. Processing of step 163 provides a stationary setting means which sets the amount of necessary power WRQ which the stationary battery 23 needs.

In step 164, the mobile device 3 supplies electric power to the stationary battery 23 from the vehicular power source. The mobile device 3 selects one or more vehicular power source from the plurality of vehicular power sources according to the amount of necessary power WRQ. Then, the mobile device 3 activates the selected vehicular power source, and supplies electric power from the selected and activated vehicular power source to the stationary battery 23 via the inter-battery power line 40. Processing of step 164 provides a selecting module which selects one or more vehicular power source based on the amount of necessary power WRQ and the amount of available power WVH, and activates the selected power sources to supply electric power to the stationary battery 23 via the inter-battery power line 40 from the selected vehicular power source.

In step 165, the stationary device 2 controls the voltage converter 41, and charges the stationary battery 23. If a predetermined electric power is charged in the stationary battery 23, the mobile device 3 stops the selected vehicular power source. The stationary device 2 stops the charge to the stationary battery 23. By processing of these steps, charge processing to the stationary device 2 from the mobile device 3 is performed.

Figure 3:
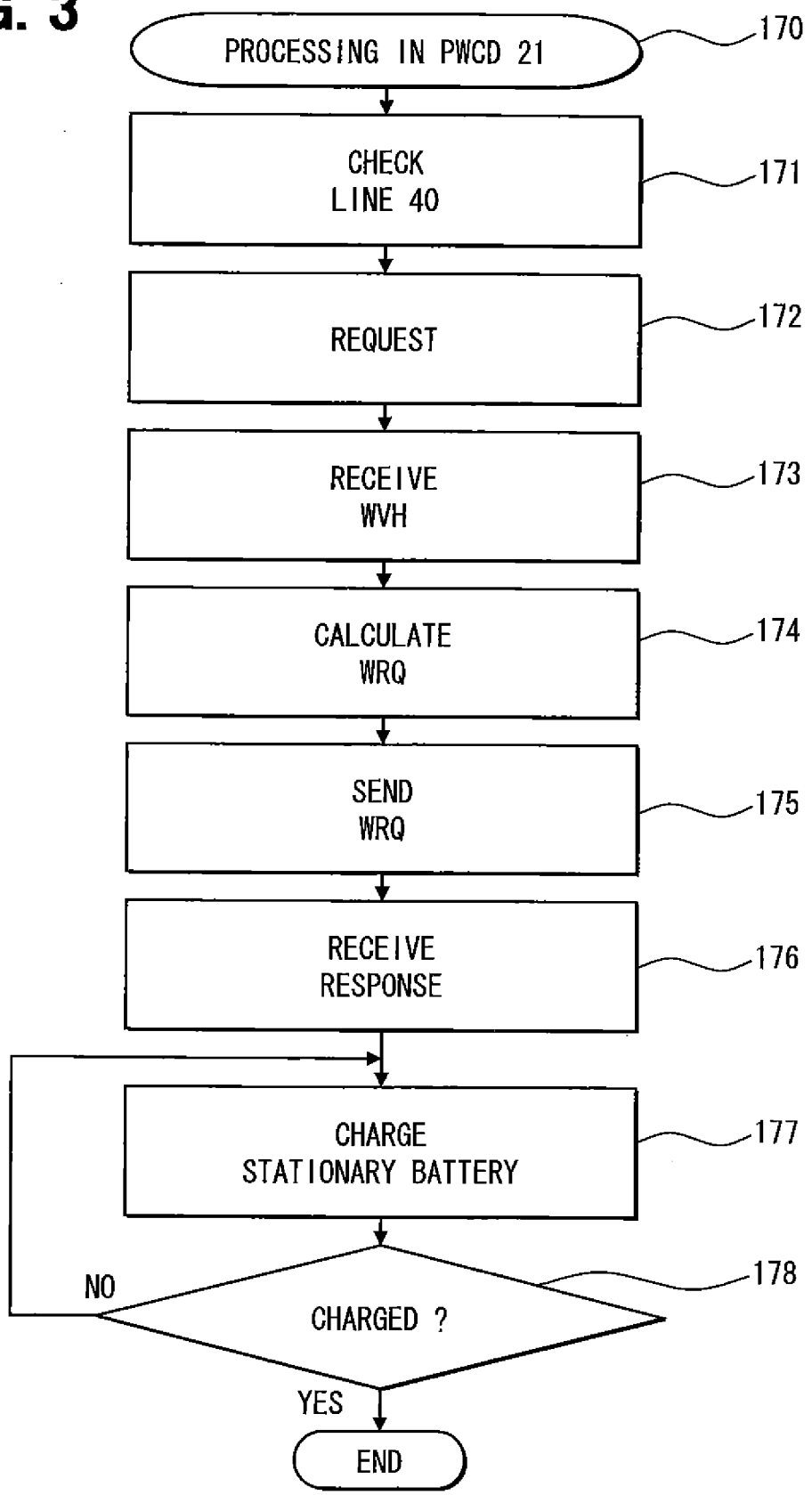
FIG. 3 is a flow chart showing an operation of a stationary electric power supply device according to the first embodiment.

FIG. 3 is a flow chart showing an operation of a stationary device 2 according to the first embodiment. Control processing 170 for the stationary device 2 is performed by the power conditioner 21. In step 171, the power conditioner 21 checks connection of the inter-battery power line 40. If the coupler 42 is connected and the inter-battery power line 40 is established, the processing proceeds to step 172. In step 172, the power conditioner 21 requires electric supply to the mobile device 3. In step 173, the power conditioner 21 receives the amount of available power WVH from the mobile device 3. In step 174, the power conditioner 21 calculates the amount of necessary power WRQ and also calculates an instruction value which shows the amount of necessary power WRQ. The amount of necessary power WRQ is set not exceed the amount of available power WVH. Thereby, it is possible to supply electric power from the mobile device 3 to the stationary device 2, without electrical overload to the plurality of vehicular power sources belonging to the mobile device 3. In step 175, the instruction value is transmitted to the mobile device 3. In other words, the power conditioner 21 sends the amount of necessary power WRQ to the mobile device 3. In step 176, the power conditioner 21 receives a response that shows completion of preparation for supplying power from the mobile device 3. In step 177, the power conditioner 21 activates and controls the voltage converter 41 and charges the stationary battery 23 via the voltage converter 41. In step 178, the power conditioner 21 checks whether the amount of necessary power WRG was received or not. In other words, the power conditioner 21 determines whether the stationary battery 23 is charged or not. Steps 177 and 178 are repeated until the amount of necessary power WRQ is received. Then, if the amount of necessary power WRQ is received, the processing is finished.

Figure 4:
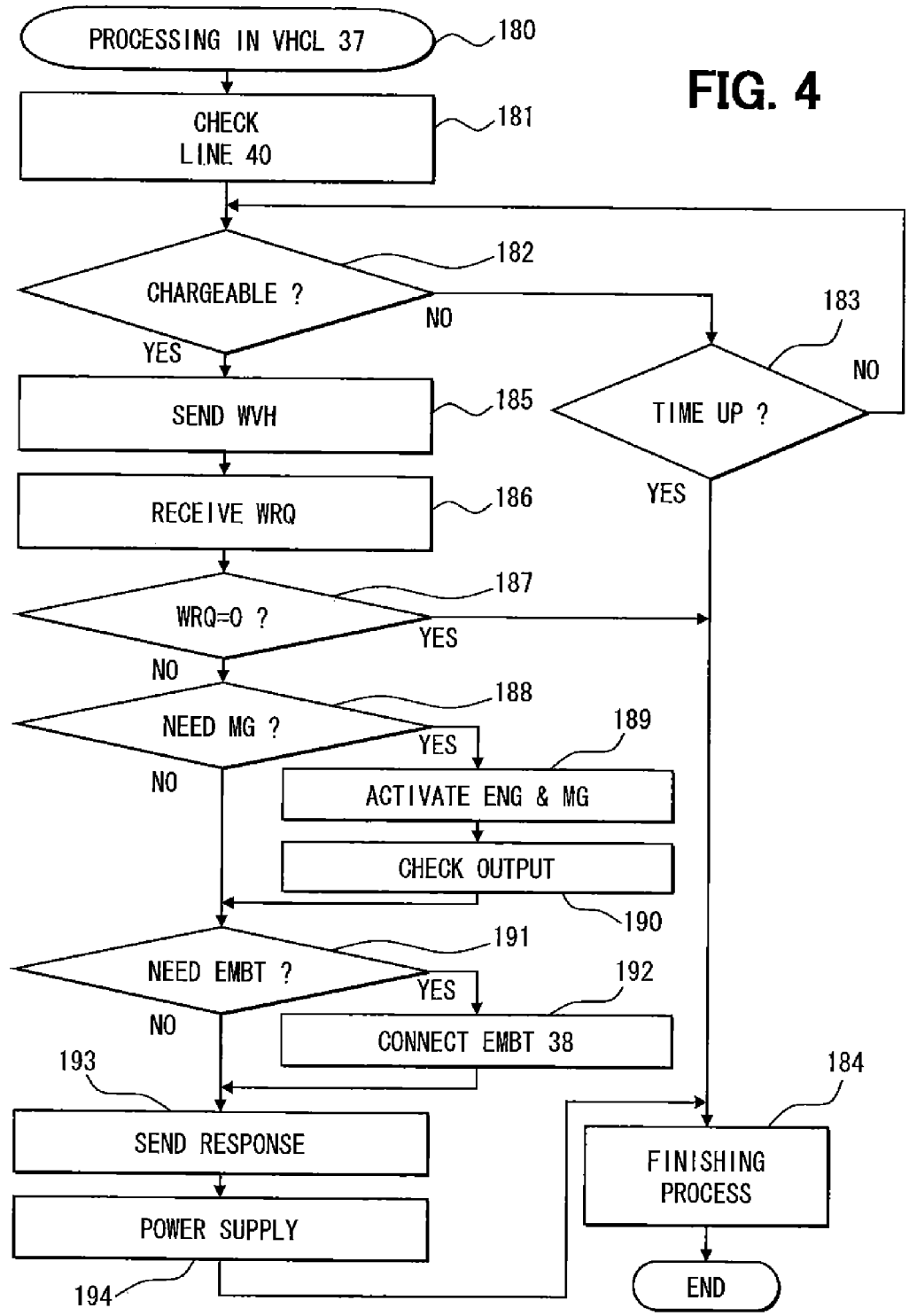
FIG. 4 is a flow chart showing an operation of a vehicular electric power supply device according to the first embodiment.

FIG. 4 is a flow chart showing an operation of a vehicular electric power supply device 3 according to the first embodiment. Control processing 180 for the mobile device 3 is performed by the control device 37. In step 181, the control device 37 checks connection of the inter-battery power line 40. If the coupler 42 is connected and the inter-battery power line 40 is established, the processing proceeds to step 182. In step 182, the control device 37 determines that whether it is in a state in which the stationary battery 23 can be charged from an external power supply. That is, the control device 37 determines that whether the switch which connects between the stationary battery 23 and the voltage converters 41 is closed. If the stationary battery 23 is in an impossible state for charging, the processing proceeds to step 183. In step 183, the control device 37 determines that whether the impossible state is continued for a predetermined time. Processing of steps 182-183 is repeated until the impossible state continues longer than the predetermined time, i.e., time up. If the impossible state continues longer than the predetermined time, the processing proceeds to step 184. In step 184, the control device 37 executes processing which finishes the control processing 180.

If the stationary battery 23 can be charged in step 182, the processing proceeds to step 185. In step 185, the control device 37 calculates the amount of available power WVH and sends the amount of available power WVH to the stationary device 2. In step 186, the control device 37 receives the instruction value from the stationary device 2. In other words, the control device 37 receives the amount of necessary power WRQ from the stationary device 3. By the above processing, information that is necessary to select one or more vehicular power source from the plurality of vehicular power sources is collected to the control device 37 in the mobile device 3. The information includes each of amounts of available power of the vehicular power sources, and the amount of necessary power which the stationary device 2 needs.

In step 187, the control device 37 determines that whether the instruction value, i.e., the amount of necessary power WRQ, is zero. If the instruction value is zero, it is a case where the stationary device 2 is not requesting charging to the stationary battery 23. Therefore, the processing proceeds to step 184.

In step 188, the control device 37 determines that whether power generation by the rotary electric machine 32 is needed or not. In step 188, the control device 37 determines that whether electric power which can be supplied by the vehicular battery 35 is less than the instruction value or not. When electric power which can be supplied by the vehicular battery 35 is less than the instruction value, an amount of electric power that is short to charge the stationary battery 23 is supplemented by generating power by driving the rotary electric machine 32 with the engine 31. In step 189, the control device 37 activates the engine 31 and the rotary electric machine 32, and operates the rotary electric machine 32 to works as a generator. Thereby, power generation is performed by the rotary electric machine 32. In step 190, the control device 37 checks output of the rotary electric machine 32. In addition, the control device 37 controls the rotary electric machine 32 to generate power that supplements the shortage of the electric power. When the generation of electrical energy by the rotary electric machine 32 is not needed, the processing proceeds to step 191.

In step 191, the control device 37 determines that whether the emergency battery 38 is needed. In step 191, the control device 37 determines that the emergency battery 38 is needed, if electric power which can be supplied by the vehicular battery 35 is running out. When the amount of charge of the vehicular battery 35 has reached a lower limit, the control device 37 controls the batteries 35 and 37 to supply electric power from the emergency battery 38 to the stationary battery 23 instead of from the vehicular battery 35. In step 192, by controlling the selector circuit 39, the control device 37 connects the emergency battery 38 to the inter-battery power line 40 instead of the vehicular battery 35. When the emergency battery 38 is not needed, the processing proceeds to step 193.

In step 193, the control device 37 sends a response to the stationary device 2. The response shows completion of preparation for supplying power from the mobile device 3. In step 194, the control device 37 activates the selected power source to initiate power supply to the inter-battery power line 40. The stationary battery 23 is charged by the selected vehicular power source. Then, the processing proceeds to step 184.

By the processing described above, module which selects one or more vehicular power source from the plurality of vehicular power sources is provided. In this embodiment, a plurality of operational modes including a first mode to a fourth mode is provided. In the first mode, the stationary battery 23 is charged only by the vehicular battery 35. In the second mode, the stationary battery 23 is charged by the vehicular battery 35 and the rotary electric machine 32 generating electrical power. In the third mode, the stationary battery 23 is charged only by the emergency battery 38. In the fourth mode, the stationary battery 23 is charged by the emergency battery 38 and the rotary electric machine 32 generating electrical power. Even if the emergency battery 38 is not mounted on the vehicle, at least the first mode and the second mode may be performed.

According to the embodiment, the inter-battery power line 40 is provided as a power line exclusive between the batteries which enable electric power supply directly between the stationary battery 23 and the vehicular battery 35. Therefore, it is possible to supply electric power in an efficient manner. In a normal condition in which the power grid 4 is functioning, the stationary battery 23 is charged from the power grid 4. Therefore, in the normal condition, the power line 40 is utilized as a part of a charging system for charging the vehicular battery 35 from the stationary device 2. On the other hand, in an abnormal condition such as when the power grid 4 gets a power failure, a plurality of vehicular power sources including the vehicular battery 35 are utilized as a power source for rescuing the stationary device 2. At this time, the power line 40 is used as a part of a power supply system from the vehicular power source to the stationary battery 23. In such a case, one or more vehicular power source are selected from the plurality of the vehicular power sources based on the amount of necessary power which the stationary device 2 needs and the available power which can be supplied from the plurality of the vehicular power sources. The stationary battery 23 is charged by the selected vehicular power source. Therefore, it is possible to charge the stationary battery 23 can be charged with a sufficient amount of electric power.

Second Embodiment

Figure 5:
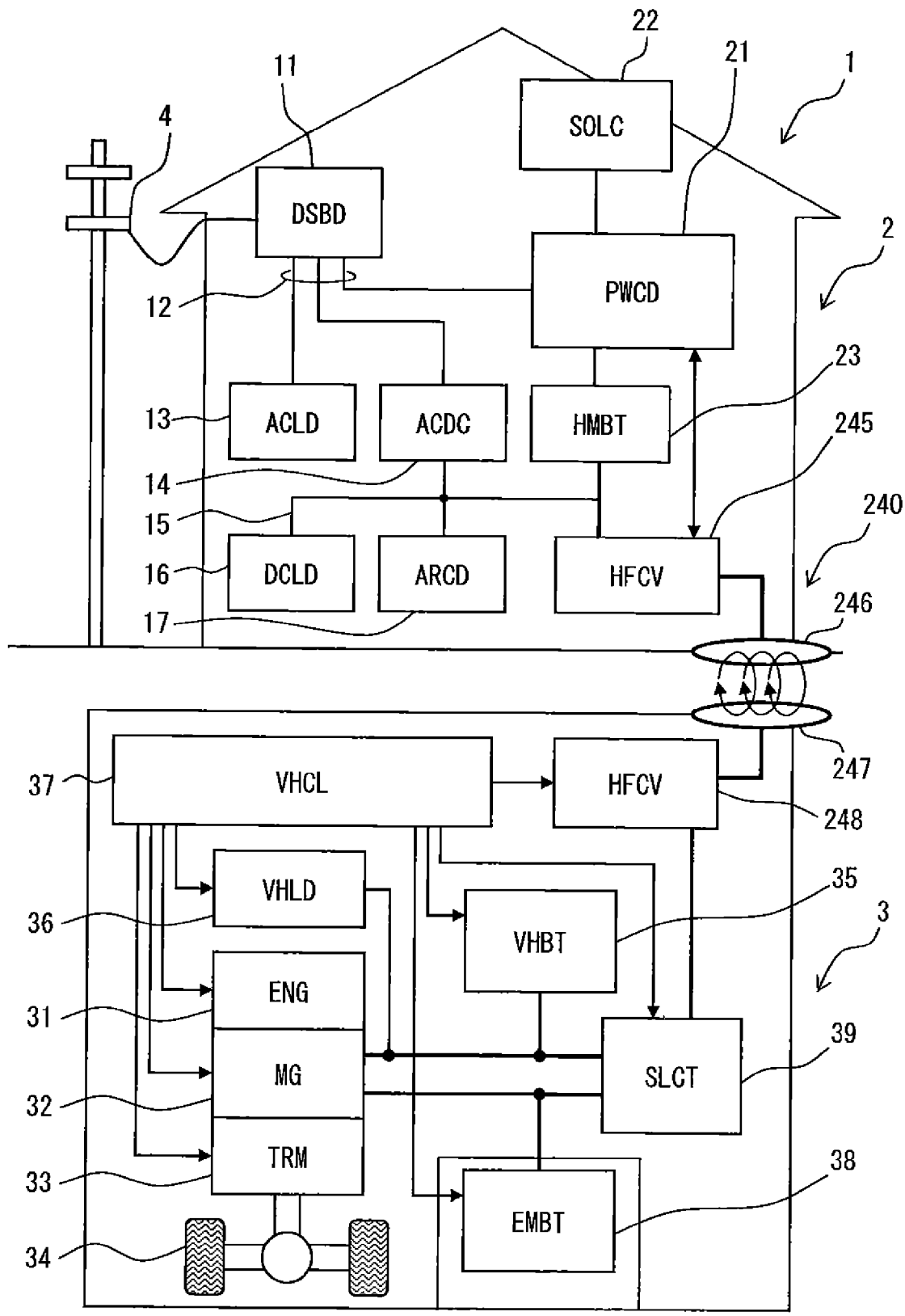
FIG. 5 is a block diagram showing a configuration of an electric power supply system according to a second embodiment of the present disclosure.

FIG. 5 is a block diagram showing a configuration of an electric power supply system 1 according to a second embodiment of the present disclosure. In the preceding embodiments, the inter-battery power connection is provided by the inter-battery power line 40 which is a direct contact type line including the coupler 42 and the cable 43. Alternatively, the inter-battery power connection is provided by the inter-battery power line 240 which is a non-contact type power transmitting device. In this embodiment, an inter-battery power line 240 is provided. The inter-battery power line 240 includes a high frequency converter (HFCV) 245 disposed in the stationary device 2. The high frequency converter 245 is connected to the stationary battery 23, and performs bidirectional conversion between DC power and high frequency AC power. The inter-battery power line 240 includes a coil 246 for inductive coupling. The coil 246 is disposed in the stationary device 2. The inter-battery power line 240 includes a coil 247 for inductive coupling. The coil 247 is disposed in the mobile device 3. The coil 246 and the coil 247 are arranged so that the coils 246 and 247 are electromagnetically coupled when the vehicle is parked at a predetermined parking place. The inter-battery power line 240 includes a high frequency converter (HFCV) 248 disposed in the mobile device 3. The high frequency converter 245 is connected to the selector circuit 39, and performs bidirectional conversion between DC power and high frequency AC power. The inter-battery power line 240 has power capacity that is larger than that of the AC line 12 and the DC line 15 which are charge-and-discharge lines for the stationary battery 23 in the stationary device 2.

Figure 6:
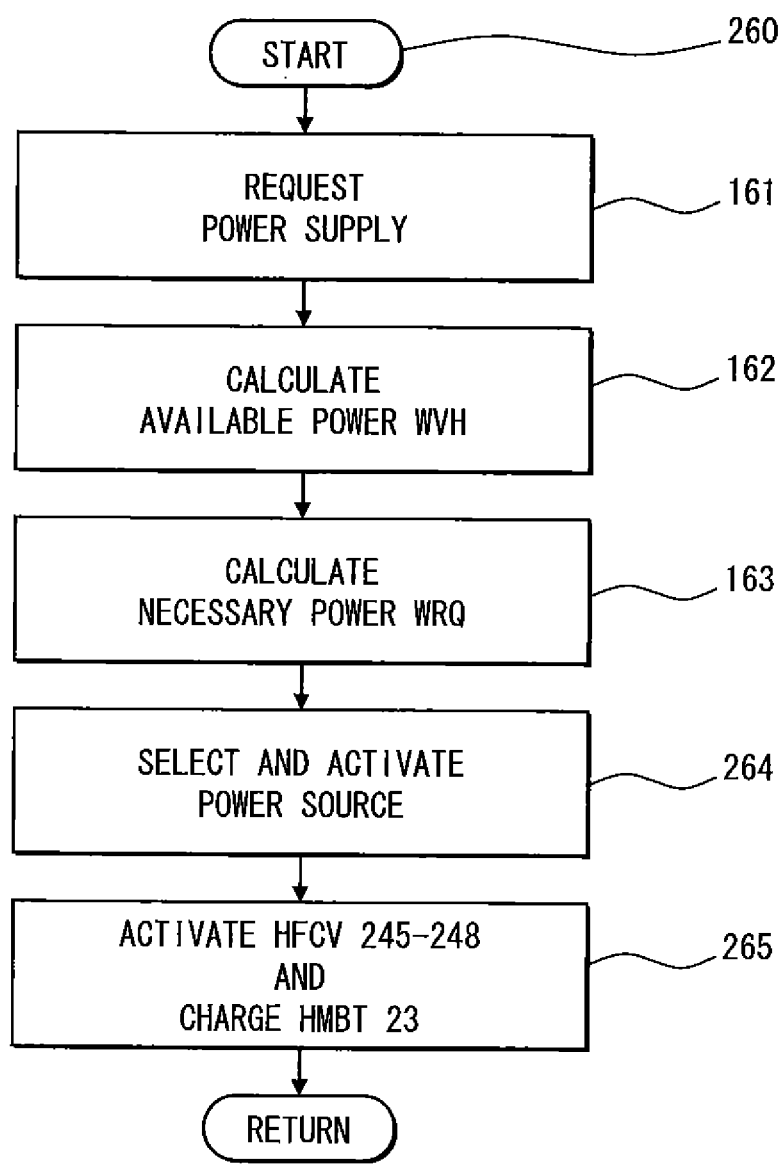
FIG. 6 is a flow chart showing an operation of the electric power supply system according to the second embodiment.

FIG. 6 is a flow chart showing an operation of the electric power supply system 1 according to the second embodiment. In the drawing, a set of power supply processing 260, which supplies electric power from the vehicular power source to the stationary battery and is performed by the power conditioner 21 and the control device 37, is illustrated. Steps 161-163 are the same as the preceding embodiments. In step 264, the mobile device 3 supplies electric power from the vehicular power source to the stationary battery 23 via the inter-battery power line 240. In the mobile device 3, the high frequency converter 248 is activated and controlled to convert electric power into high frequency electric power, and to supply it to the coil 247. The high frequency electric power supplied to the coil 247 induces high frequency electric power in the coil 246. In step 265, the stationary device 2 controls the high frequency converter 245 which is a non-contact converter. Thereby, the high frequency electric power induced in the coil 246 is transformed into DC electric power. The DC electric power is supplied to the stationary battery 23.

Other Embodiments

The preferred embodiments of the present disclosure have been described. However, the present disclosure is not limited to the above embodiments, and the above embodiments may be modified in various ways without departing from the spirit and scope of the disclosure. The configuration of the above described embodiments is just examples. The disclosure in its broader terms is therefore not limited to the specific details, representative apparatus, and illustrative examples shown and described. The extent of the present disclosure is shown by the scope of the claims, and also includes the changes, which is equal to and within the same range of the scope of the claim.

For example, in the above-mentioned embodiment, the control devices 21 and 37 and the control processing 170 and 180 are arranged to the stationary device 2 and the mobile device 3. Alternatively, the control devices 21 and 37 and the control processing 170 and 180 may be intensively arranged to either the stationary device 2 or the mobile device 3. For example, the stationary device 2 may be configured to perform selecting processing which selects one or more vehicular power sources based on the amount of necessary power and the amount of available power, and to instruct the selection result to the mobile device 3.

In the above-mentioned embodiment, the inter-battery power lines 40 and 240 were used also for the charge from the stationary battery 23 to the vehicular battery 35. Alternatively, the inter-battery power lines 40 and 240 may be used only at the time of the abnormalities, such as the time of power failure. For example, charging from the stationary battery 23 to the vehicular battery 35 may be performed as a low speed charging or middle speed charging by using a comparatively small first current value. Such a slower charging is performed by supplying the first current via another inter-battery power line of small power capacity that is different from the inter-battery power lines 40 and 240. The charging from the vehicular battery 35 to the stationary battery 23 via the inter-battery power lines 40 and 240 may be performed as a high-speed charging by using a second current value larger than the first current value.

For example, the means and function provided by the control device may be provided by software only, or hardware only, or combination of software and hardware. For example, the control device may be provided by an analog circuit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electric power supply system comprising: a stationary device including a stationary battery; a mobile device including a plurality of vehicular power sources including a generator driven by an engine and a vehicular battery; and an inter-battery power connection arranged between the stationary battery and the vehicular battery for DC electric power supply there between, wherein the inter-battery power connection includes a voltage converter provided in the stationary device, which permits power supply from the stationary battery to the vehicular battery and power supply from the vehicular power source to the stationary battery, and wherein the stationary device includes: a stationary setting module to set up an amount of necessary power which the stationary battery needs, and a charging module that charges the stationary battery from the vehicular power source by controlling the voltage converter, and wherein the mobile device includes: a vehicular setting module to set up an amount of available power which can be supplied by the plurality of vehicular power sources, and a selecting module that selects one or more vehicular power source from the plurality of vehicular power sources based on the amount of necessary power and the amount of available power, and activates the selected vehicular power source to supply electric power to the stationary battery via the inter-battery power connection, and wherein the stationary setting module sets the amount of necessary power so that the amount of necessary power supplies at least a part of an amount of consuming electricity presently consumed in the stationary device and not exceeding the amount of available power, and wherein the selecting module provides at least a first mode and a second mode, the stationary battery being charged only by the vehicular battery in the first mode, and when electric power which can be supplied by the vehicular battery is less than the amount of necessary power, an amount of electric power that is short to charge the stationary battery is supplemented by generating power by driving the generator with the engine, and the stationary battery is charged by both the vehicular battery and the generator generating electrical power in the second mode.

2. The electric power supply system according to claim 1, wherein
the inter-battery power connection has a power capacity larger than that of a charge-and-discharge line for the stationary battery in the stationary device.

3. The electric power supply system according to claim 2, wherein
the engine is a source for moving the vehicle, and the vehicular battery is a battery which supplies electric power to an electric motor for moving the vehicle and is charged by the generator.

4. The electric power supply system according to claim 1, wherein
the plurality of vehicular power sources includes a emergency battery which supplies power to rescue the vehicle and is separately disposed from the vehicular battery.

5. The vehicular electric power supply device according to claim 1, wherein
the mobile device further includes:
a sending module which sends the amount of available power to the stationary device;
a receiving module which receives the amount of necessary power from the stationary device; and
a power supply initiating module which activates the selected power source to initiate power supply to the inter-battery power line after completion of preparation for supplying power from the mobile device.

6. A vehicular electric power supply device comprising:
a plurality of vehicular power sources including a generator driven by an engine and a vehicular battery;
a vehicular setting module to set up an amount of available power which can be supplied by the plurality of vehicular power sources; and
a selecting module that selects one or more vehicular power source from the plurality of vehicular power sources based on an amount of necessary power which a stationary battery in a stationary device needs and the amount of available power, and activates the selected vehicular power source to supply electric power to the stationary battery via an inter-battery power connection arranged between the stationary battery and the vehicular battery for DC electric power supply therebetween, the amount of necessary power being set so that the amount of necessary power supplies at least a part of an amount of consuming electricity presently consumed in the stationary device and not exceeding the amount of available power, and wherein
the selecting module provides at least a first mode and a second mode, the stationary battery being charged only by the vehicular battery in the first mode, and when the electric power that can be supplied by the vehicular battery is less than the amount of necessary power, an amount of electric power that is short to charge the stationary battery is supplemented by generating power by driving the generator with the engine, and the stationary battery is charged both by the vehicular battery and the generator generating electrical power in the second mode.

7. The vehicular electric power supply device according to claim 6, wherein
the inter-battery power connection has a power capacity larger than that of a charge-and-discharge line for the stationary battery in the stationary device.

8. The vehicular electric power supply device according to claim 7, wherein
the engine is a source for moving the vehicle, and the vehicular battery is a battery which supplies electric power to an electric motor for moving the vehicle and is charged by the generator.

9. The vehicular electric power supply device according to claim 6, wherein
the plurality of vehicular power sources includes a emergency battery which supplies power to rescue the vehicle and is separately disposed from the vehicular battery.

10. The vehicular electric power supply device according to claim 6, wherein
the mobile device further includes:
a sending module which sends the amount of available power to the stationary device;
a receiving module which receives the amount of necessary power from the stationary device; and
a power supply initiating module which activates the selected power source to initiate power supply to the inter-battery power line after completion of preparation for supplying power from the mobile device.

\* \* \* \* \*